Jan. 17, 1928.
H. C. MALLORY
1,656,213
METHOD OF PRODUCING EXPANSIBLE COLLAPSIBLE ELEMENTS
Original Filed Aug. 31, 1920
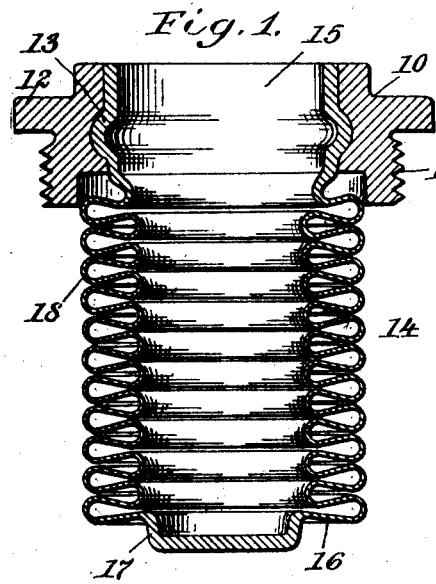
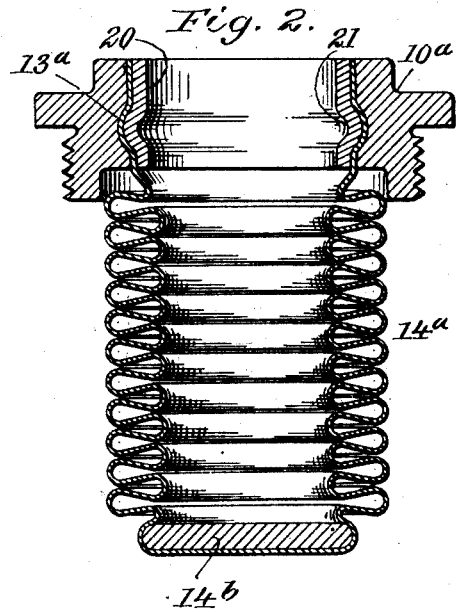
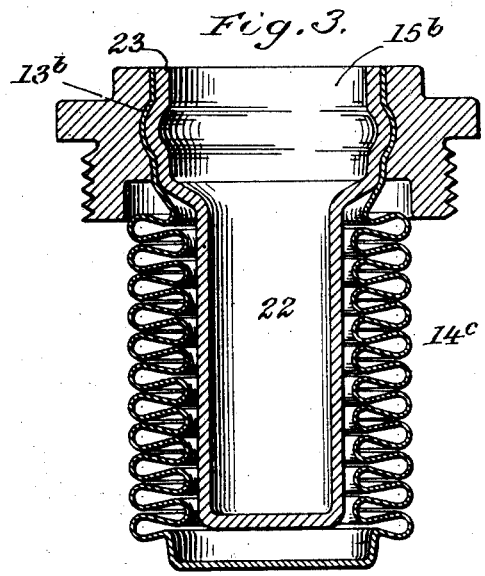
INVENTOR.

Patented Jan. 17, 1928.

UNITED STATES PATENT OFFICE.

HARRY C. MALLORY, DECEASED, LATE OF BELLPORT, NEW YORK, BY SUE R. MALLORY, ADMINISTRATRIX, OF BELLPORT, NEW YORK; HARRY C. MALLORY ASSIGNOR, BY MESNE ASSIGNMENTS, TO AMERICAN RADIATOR COMPANY, OF CHICAGO, ILLINOIS, A CORPORATION OF NEW JERSEY.

METHOD OF PRODUCING EXPANSIBLE-COLLAPSIBLE ELEMENTS.

Original application filed August 31, 1920, Serial No. 407,209. Patent No. 1,484,140, dated February 19, 1924. Divided and this application filed January 16, 1924. Serial No. 686,499.

The invention relates to improvements in methods of making flexible or elastic elements adapted for use in connection with apparatus or devices, subject to or influenced by temperature or pressure variations, whereby to operate a valve or other apparatus or mechanisms.

Further, said invention has for its object to provide a method of making a flexible or elastic element to be interposed between two or more parts of an apparatus or device, certain of which are movable with respect to the other thereof, to form a flexible fluid-tight joint yieldingly connecting said parts.

Further, said invention has for its object to provide a method of making and securing a tubular flexible or elastic corrugated element to a support, whereby the same may be attached or secured to a valve or other part or device in connection with which said element is to be used.

Further, said invention has for its object to provide a method of making and securing a tubular, flexible corrugated element to an attaching member and form a fluid-tight joint at the junction of said parts, whereby said element may be readily attached to, and serve to seal the valve or other part or device in connection with which said element is to be used.

Other objects will in part be obvious, and in part be pointed out hereinafter.

To the attainment of the aforesaid objects and ends the invention consists in the several successive steps constituting the method hereinafter more fully described, and then pointed out in the claims.

In the accompanying drawings forming part of this specification wherein like numerals of reference indicate like parts.

Figure 1 is a central, vertical section showing one form of expansible-collapsible element, and supporting means therefor constructed according to said invention;

Fig. 2 is a similar view showing a modified construction in which the end of the expansible-collapsible element is secured in position by an annular member which serves also to reinforce the end of said element and to render the joint at the junction of said parts fluid-tight, and Fig. 3 is a similar view illustrating a further modification in which the open end of the expansible-collapsible element is secured within a support by the flanged portion of a cylindrical member or closure.

In said drawings 10 designates a support which is herein shown in the form of an annular member having its outer edge screw-threaded at 11, and provided above said screw-threaded portion with a shoulder 12. The inner side of said member 10 is provided with an annular groove 13. 14 denotes an expansible-collapsible element which is shown as cylindrical in form and provided with an open end 15, and a closed end 16 having a reduced projection or boss 17 extending therefrom. The open end 15 of the element 14 is preferably made of greater thickness than the remainder of the element in order to facilitate the attachment thereof to a support or other part. The body or intermediate portion of the element 14 is circumferentially corrugated to form a series of corrugations or folds 18.

In order to secure the expansible-collapsible element to the support or member 10 it merely becomes necessary to insert the open end 15 into the opening in the annular member 10, as shown in Fig. 1, and then by means of a suitable die, or by pressure expand or force an annular portion of the closed end 15 into the annular groove 13 in the side of said supporting member 10 whereby said parts will be firmly secured together.

Hereupon the expansible-collapsible element may be inserted into the opening in a valve casing or other device or part and secured in position therein by means of its threaded portion 11 engaging with registering threads in the cooperating part.

In the modified construction shown at Fig. 2, the expansible-element 14$^a$, and the supporting member 10$^a$ are substantially the same as illustrated and described in connection with Fig. 1, except that in the present instance the element 14$^a$ is shown having its side wall and closed end of uniform thickness, and its closed end reinforced by a disk 14$^b$ secured within said closed end. The open end of said element 14$^a$, which is disposed within the opening in the support 10ᵃ, is secured thereto by a separate annular member 20 having an annular bead 21 formed therein by forcing or expanding the wall of said member 20, and the open end of the element 14ᵃ into the annular groove 13ᵃ provided in the inner side of the opening in said support 10ᵃ.

In the construction illustrated at Fig. 3 the parts are similarly secured together as shown and described in connection with Fig. 2, except that in this form the open end 15ᵇ of the expansible-collapsible element 14ᶜ is closed by a member 22 of smaller diameter than the interior of the element 14ᶜ which extends into the same, and is provided at its open end with a flange 23 which is forced or expanded into the annular groove 13ᵇ of the support by producing an annular bead in the portion of said element adjacent to its open end.

It will of course, be obvious that the providing of the annular support 10, 10ᵃ with screw threads illustrates only one form of attachment, and that the said support with the expansible element carried thereby may be secured in many other ways to, or within a cooperating device or part.

This application is a division of a co-pending application filed by said Harry C. Mallory on August 31, 1920, Serial Number 407,209, which was a division of his earlier application, Serial Number 833,593, and which application, Serial No. 833,593 eventually resulted in Patent No. 1,366,473, dated January 25, 1921, and which application, Serial No. 407,209, eventually resulted in Letters Patent No. 1,484,140, dated February 19, 1924.

Having thus described said invention, what is claimed and desired to be secured by Letters Patent is:—

1. The process of making a device of the character described which consists in forming a relatively thin shell having a readily deformable-flange at one end, circumferentially corrugating the intermediate part of said shell to render the same elastic, associating said shell with a support having a groove therein, and pressing said flange into said groove in contact with the entire surface thereof to form a fluid-tight joint and to secure said shell to said support, substantially as specified.

2. The process of making a device of the character described which consists in forming a relatively thin shell having a readily deformable annular flange at one end, circumferentially corrugating the intermediate part of the shell to render the same elastic, associating said shell with a support having an internal groove therein, and pressing said flange into said groove in contact with the entire surface thereof to form a fluid-tight joint and to secure said shell at one end to said support and permit of the free movement of the opposite end of said shell towards and away from said support, substantially as specified.

3. The process of making a device of the character described which consists in forming a relatively thin shell, circumferentially corrugating the intermediate part thereof to render the same elastic, inserting one end of said shell into a support having an internal groove therein, disposing a readily deformable end closure within said shell, and pressing a portion of said shell and of said closure annularly into the internal groove in said support, whereby to seal said shell and secure the sealed end of said shell to said support, substantially as specified.

4. The process of making a device of the character described which consists in forming a relatively thin shell, circumferentially corrugating the intermediate part thereof to render the same elastic, inserting one end of said shell into a support having an annular groove therein, disposing an annular member within said shell, expanding a portion of said shell and of said annular member to form beads thereon received into the groove in said support, whereby to seal said shell and secure the sealed end of said shell to said support and permit of the free movement of the opposite end of said shell relative thereto, substantially as specified.

5. The process of making a device of the character described which consists in forming a relatively thin tubular shell, circumferentially corrugating the intermediate part thereof to render the same elastic, inserting one end of said shell into a support having an annular groove therein, disposing within said shell a readily deformable closure having an end wall portion arranged parallel to the end of said shell, and expanding a portion of the end of said shell and a portion of the wall portion of said closure annularly outwardly to form beads extending into the groove in said support, whereby to seal said shell and secure the sealed end of said shell to said support and permit of the free movement of the opposite end of said shell relative thereto, substantially as specified.

Signed at New York city, in the county of New York and State of New York, this 15th day of January, one thousand nine hundred and twenty-four.

SUE R. MALLORY,

*Administratrix of the Estate of Harry C. Mallory, Deceased.*